United States Patent Office 3,026,268
Patented Mar. 20, 1962

3,026,268
PROCESS FOR REGENERATING CATALYSTS
Carl D. Keith, Summit, N.J., and Emmett H. Burk, Jr., Hazel Crest, and John Mooi, Park Forest, Ill., assignors to Sinclair Refining Company, New York, N.Y., a corporation of Maine
No Drawing. Filed Jan. 31, 1958, Ser. No. 712,313
10 Claims. (Cl. 252—419)

This invention relates to a process for regenerating a catalyst of the type described in the copending application of Keith and Burk Serial No. 683,931, filed September, 16, 1957, which includes a supporting material, a noble metal, and a Friedel-Crafts catalyst. More particularly, the present invention is concerned with a process for regenerating the catalyst with a regeneration gas, e.g. hydrogen or hydrogen and hydrogen halide, and heat. These catalysts have particular utility in the hydrocarbon conversion field, e.g. cracking, isomerization, and alkylation processes and especially in a process described in the above copending application directed to the isomerization of $C_4$–$C_9$ n-paraffinic-containing hydrocarbon materials at relatively low temperatures while obtaining satisfactory conversion to isomer structures.

As described in the above copending application, the catalyst includes catalytically effective amounts of a noble or platinum metal, an aluminum halide Friedel-Crafts component and, at least ultimately in the isomerization system, a hydrogen halide, all of which are supported on an alumina base. The base is usually the major component of the catalyst, constituting about 40 to 95 weight percent, preferably at least about 50%. The catalyst base is an activated or gamma-alumina such as those derived by calcination of amorphous hydrous alumina, alumina monohydrate, alumina trihydrate or their mixtures. The catalyst base precursor most advantageously is a mixture predominating, for instance about 65 to 95 weight percent, in one or more of the alumina trihydrates bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, boria, natural or activated clays (such as kaolinite, montmorillonite, halloysite, etc.), titania, zirconia, etc., or their mixtures.

The catalyst generally contains about 0.01 to 2 weight percent, preferably 0.1 to 0.75 weight percent, of one or more of the platinum metals of group VIII, that is platinum, palladium, rhodium, ruthenium, osmium or iridium. The small amount of noble metal may be present in the metallic form or as a sulfide, oxide or other combined form. The metal may interact with other constituents of the catalyst, but if during use the noble metal be present in metallic form then it is preferred that it be so finely divided that it is not detectable by X-ray diffraction means, i.e. that it exists as crystals of less than 50 angstrom units size. Of the noble metals, platinum is preferred.

The aluminum halide Friedel-Crafts component usually is about 2 to 50 weight percent, preferably about 10 to 30 weight percent, of the catalyst and this component can be, for instance, $AlCl_3$, $AlF_3$, $AlBr_3$ and similar metal halides where one or more of the anions are replaced with another anion such as hydroxide. Mixtures of these Friedel-Crafts components can also be used; aluminum chloride, is, however, the preferred Friedel-Crafts component.

Another component of the catalyst can be a hydrogen halide and the catalyst may advantageously contain about 0.5 to 15 weight percent or more of a hydrogen halide. The hydrogen halides include, for instance, hydrogen chloride, hydrogen bromide, hydrogen fluoride and their mixtures and preferably the amount of this component on the alumina base is less than about 10% of the catalyst. Although the components of the catalyst can vary; as illustrated above, the preferred catalyst employed in the process of our invention contains platinum and aluminum chloride deposited on activated alumina.

The preferred base or supporting material is an activated or gamma-alumina made by calcining a precursor predominating in alumina trihydrate. An alumina of this type is disclosed in application Serial No. 288,058, filed May 15, 1952, now abandoned, and its continuation-in-part application Serial No. 489,726, filed February 21, 1955, now U.S. Patent No. 2,838,444. The alumina base is derived from a precursor alumina hydrate composition containing about 65 to 95 weight percent of one or more of the alumina trihydrate forms gibbsite, bayerite I and bayerite II (randomite) as defined by X-ray diffraction analysis. The substantial balance of the hydrate is amorphous hydrous or monohydrate alumina. Trihydrates are present as well-defined crystallites, that is they are crystalline in form when examined by X-ray diffraction means. The crystallite size of the precursor alumina trihydrate is relatively large and usually is in the 100 to 1000 angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in these applications the calcined catalyst can be characterized by large surface area ranging from about 350 to about 500 or more square meters/gram when in the virgin state as determined, for example, by the BET adsorption technique. A low area catalyst prepared by treating the predominantly trihydrate base precursor is described in application Serial No. 581,250, filed April 27, 1956, now U.S. Patent No. 581,250, filed April 27, 1956, now U.S. Patent No. 2,838,445. This base when in the virgin state has substantially no pores of radius less than 10 angstrom units and the surface area of the catalyst is less than 350 square meters/gram and most advantageous is in the range of about 150 to 300 square meters/gram.

The catalyst can be advantageously prepared in accordance with a process described in copending application Serial No. 712,315, filed January 31, 1958. According to this process, the aluminum halide Friedel-Crafts catalyst is added to a noble metal-activated alumina composition. The noble metal-activated alumina composition can be prepared by known procedures. For instance, the platinum metal component can be deposited on a calcined or activated alumina, but it is preferred to add the platinum metal component to the alumina hydrate base precursor. Thus platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma-alumina modifications. The addition of the Friedel-Crafts component to the high area catalyst bases of applications Serial Nos. 288,058 and 489,726 has been found to decrease the surface area, for instance, directly related to the amount of Friedel-Crafts component added. Use of the catalyst in the isomerization system or hydrogen pretreatment increases the area apparently through loss of the Friedel-Crafts component.

The aluminum halide Friedel-Crafts component can be added to the noble metal-alumina composition in vapor form in a flowing gas such as nitrogen, for example; however, we prefer to place the aluminum halide Friedel-Crafts component in vapor form on the platinum-alumina composition by placing the Friedel-Crafts component and the noble metal-alumina composition in a common vessel provided with some means for agitating the mixture of materials, applying heat and agitating the mixture to produce the catalyst.

A hydrogen halide component can be added to the noble metal-alumina-aluminum halide composite by supplying the hydrogen halide as such or by employing an organo-halogen compound or other substance which will produce the hydrogen halide. The hydrogen halide can be added to the composite by contacting the composite directly with hydrogen halide. When using the catalyst in a conversion process, however, such as the isomerization of $C_4$ to $C_9$ n-paraffinic-containing hydrocarbon materials, the hydrogen halide can be added to the noble metal-aluminum halide-alumina composite after it is placed in the isomerization reactor. Conveniently this is done by including in the n-paraffin feed about 0.05 to 35 weight percent, advantageously about 0.5 to 5 weight percent of the hydrogen halide or of a hydrogen halide-producing material. The addition of the hydrogen halide in these concentrations based on the n-paraffin, is continued over the processing period in order to maintain an adequate concentration of this component on the alumina base and insure the stability of the catalyst against undue aging. The hydrogen halide can be added separately to the reaction system, in the hydrogen-containing recycle gases or in the n-paraffin feedstock. Also, as pointed out above, the hydrogen halide on the alumina base might be added to the catalyst before charging it to the reactor.

When using an organo-halogen compound or other substance as the hydrogen halide supplier, it can also be employed to conveniently supply the hydrogen halide to the catalyst composite under conditions which the catalyst may be subjected to. Suitable hydrogen halide precursors include the elemental halogens, chlorine, bromine and fluorine; mono-and polyhalo-alkanes such as carbon tetrachloride, chloroform and tertiary butyl chloride; or other available materials which will be converted under the conditions of the process in which the catalyst is used, for instance when under isomerization conditions of free hydrogen and temperatures of about 150 to 450° F., to obtain the hydrogen halide.

The noble metal-aluminum halide-alumina catalyst is particularly suitable for use in an isomerization process permitting the use of relatively low reaction temperatures for the isomerization of n-paraffinic hydrocarbons to obtain good yields of branched chain aliphatic structures as described in the above-mentioned application of Keith and Burk Serial No. 683,931, filed September 16, 1957. The branched chain aliphatic structures are highly useful as a component for improving the octane rating of gasoline.

This isomerization process includes contacting $C_4$ to $C_9$ n-paraffinic hydrocarbon material, in vapor form, with a platinum-aluminum halide-alumina catalyst at a temperature of about 150 to 450° F. in the presence of free hydrogen and while providing hydrogen halide preferably in the n-paraffinic hydrocarbon feed. The hydrogen halide may be provided by a precursor such as carbon tetrachloride under the reaction conditions.

Free or molecular hydrogen must be present in the isomerization reaction system and the hydrogen to n-paraffin molar ratio will usually be from about 0.01 to 15:1 or more, preferably about 1 to 10:1. When processing n-butane the lower concentrations of hydrogen, e.g. less than a one to one molar ratio of hydrogen to n-butane, may be usable with advantage. Conveniently, the hydrogen concentration is maintained by recycling hydrogen-rich gases from the reaction zone. These gases contain hydrogen halide at least after the initial processing period and as there is usually no substantial consumption of the halide after this period the desired concentration in the feed can be maintained merely by recycling the hydrogen-containing gases, for instance, the hydrogen halide concentration can with advantage be about 0.5 to 35 volume percent of the recycled gases.

The noble metal-aluminum halide-alumina catalyst employed in hydrocarbon conversion processes, e.g. an isomerization process as described above, may become at least temporarily deactivated during use for example, its hydrocarbon conversion activity is significantly reduced or more specifically, its isomerization, cracking, or alkylating activity is reduced below the activity limits desirable for the catalyst in any of the hydrocarbon conversion processes in which the catalyst is used. For instance, a deactivated catalyst can be described as one which has lost about 20 to 80 percent of its virgin activity, but preferably before it has lost about 50 percent of its virgin activity. Although the exact reason for this deactivation is not known, it is believed to occur as a result of some processing upset such as for example, the presence of sulfur or sulfur-containing compounds, heavier hydrocarbons, carbon, or aromatics in the feed materials or the presence of oxygen-containing compounds, e.g. water (hydrolyzes the aluminum halide), to cause poisoning of the noble metal, loss of aluminum halide, or carbon plugging of the catalyst pores. The nature of catalyst deactivation, due to processing upsets of this character, is generally believed to result from sulfur contamination of the catalyst, catalyst adsorption of heavier hydrocarbons as well as sulfur contamination due to the complexing of the aluminum halide with impurities in the feed, e.g. aromatics and thiophene, and carbon contamination due to coke fouling. The loss of aluminum halide by vaporization under processing conditions may also cause deactivation of the catalyst.

The feed material empolyed in hydrocarbon conversion processes using the noble metal-aluminum halide-alumina catalyst is derived from crude petroleum hydrocarbons, as by distillation reforming or extraction processes and is usually desulfurized using a conventional hydrodesulfurization catalyst, e.g. a cobalt-molybdenum catalyst, under hydrodesulfurization conditions, e.g. about 650 to 750° F. and 1000 p.s.i.g. The feed is generally a $C_4$ to $C_{12}$ paraffinic-containing hydrocarbon cut of a, for example, straight run gasoline, but often in the case of isomerization feeds, is a $C_4$ to $C_9$ n-paraffinic-containing cut, while in the case of cracking feeds it is often a hydrocarbon material containing a predominant amount of $C_8$ to $C_{12}$ paraffinic materials and in the case of alkylation feeds it is often a hydrocarbon material containing $C_4$ to $C_{10}$ paraffinic materials. These feeds generally have a sulfur content of less than about 0.01, for instance about 0.01 to 0.001 weight percent but usually .005 to .002; an aromatic content generally less than about 0.5, usually from about 0.001 to 0.1 weight percent; an oxygen content generally from about .005 to .0005 but usually about .001 weight percent; and small amounts of nitrogen, usually less than about 0.001, preferably less than about 0.0002 weight percent. The sulfur can be present as sulfur or as sulfur-containing compounds, e.g. $H_2S$, mercaptans, thiophenes, and sulfides; the aromatics as benzene and alkyl benzenes, e.g. toluene; the oxygen as water, alcohol, e.g. ethanol, and ethers, e.g. diethyl ether; and the nitrogen as amines, $NH_3$, pyridine, and amino alcohols, e.g. ethanolamine.

Among the more specific catalyst contaminants often present in the feed materials employed in processes using the above-described noble metal-aluminum halide-alumina catalyst, and believed at least partially responsible for catalyst deactivation is sulfur or sulfur-containing compounds, e.g. $H_2S$. The presence of these sulfur materials in the hydrocarbon or hydrogen feeds may cause deactivation of the noble metal at the generally relatively low temperatures of hydrocarbon conversion processes employing the catalyst. Another catalyst contaminant is the heavier hydrocarbon material present in the feed such as hexane, in an n-pentane feed, and this type of contaminant causes the loss of catalyst activity for pentane isomerization. Although the maximum toleration of hexane in n-pentane has not been established, it is believed that catalyst deactivation is caused by preferential adsorption of the heavier hydrocarbons by the catalyst. Another factor believed to be the cause of catalyst deactivation is the formation of aluminum halide complexes with contaminants; e.g. aromatics such as benzene, sulfur and nitrogen compounds, described above and present in the feed. These and other deleterious effects produced on the catalyst are substantially reduced by regenerating the catalyst according to the process of the present invention.

In our process, the deactivated catalyst is regenerated by heating the catalyst at temperatures generally from about 250° to 1200° F. in a flowing stream of inert or non-oxidizing gas such as a hydrogen-containing gas, e.g. hydrogen, hydrogen and nitrogen, or hydrogen and hydrogen halide; and nitrogen. As set forth above, catalyst deactivation can also be due to the loss or hydrolysis of aluminum halide and thus it may also be desirable to add aluminum halide to the catalyst.

The loss of aluminum halide from the catalyst by vaporization may not offer a serious problem since anhydrous aluminum halide can be continuously added to the catalyst by dissolving aluminum halide in, for example, the isomerization feed, or by adding aluminum halide to a hydrogen stream employed in a hydrocarbon conversion process, e.g. isomerization process. The preferred procedure for adding aluminum halide, however, would be to discontinue the feed, purge the hydrocarbon from the system and add aluminum halide to the reactor system by carrying it in a flowing gas such as hydrogen. It would also be possible to add solid aluminum halide to the top of the catalyst bed and then vaporize aluminum halide onto the catalyst by heating in a flowing gas such as hydrogen or nitrogen. An additional procedure includes adding aluminum metal to the top of the catalyst bed to produce aluminum halide in the reactor proper by the addition of a halogenating agent such as hydrogen halide, chlorine, carbon tetrachloride and preferably hydrogen chloride. The hydrolysis of the aluminum halide can be avoided by insuring that water or water precursors are removed from the hydrocarbon and the hydrogen feeds employed in the particular hydrocarbon conversion process using the catalyst. If, however, the catalyst is deactivated due to hydrolysis it may be regenerated by adding aluminum halide as previously described or by heating the catalyst in a stream of hydrogen halide, e.g. hydrogen chloride or a haloalkane, e.g. carbon tetrachloride.

Subjection of the relatively deactivated catalyst to our process would conceivably reduce the PtSx, formed possibly as a result of a sulfur contaminant, to Pt⁰ and at the same time decompose any aluminum halide-sulfur complex so that the sulfur compound would be swept from the reactor, as well as remove the heavier hydrocarbons from the catalyst since it has been found that upon removal of the heavier hydrocarbons from the feed (n-pentane), the catalyst slowly regains its activity for pentane isomerization.

In one embodiment of our catalyst regeneration process, the deactivated catalyst is heated at temperatures generally from about 450° to 700° F. in a flowing stream of hydrogen-containing gas, e.g. hydrogen or hydrogen and hydrogen halide, for a period of time sufficient to remove significant amounts of deleterious materials; e.g. heavy hydrocarbons, e.g. cyclohexane and $C_8$ to $C_{12}$ paraffinic impurities; and hydrogen sulfide or until the exit gases are relatively free of hydrogen sulfide. Although a fresh hydrogen-containing gas can be used, we prefer to remove the deleterious materials and recycle the gas used in our process.

In a second embodiment of our catalyst regeneration process, we initially heat the deactivated catalyst at temperatures of at least about 750° F. and preferably not above 1100° F. in a flowing stream of the hydrogen-containing gas at a velocity generally of about 100 to 1000 volumes of gas per hour per volume of catalyst (VHSV), but preferably about 500 to 600 VHSV, to substantially remove the aluminum halide present. Hydrogen is purged from the vicinity of the catalyst with nitrogen or other inert gas and an oxygen-containing or oxidizing gas is introduced, primarily to burn off carbon deposited on the catalyst during the conversion of petroleum hydrocarbon feedstock, and an area of combustion is created in the presence of the catalyst. This oxidizing gas or oxygen-containing gas, e.g. an oxygen-nitrogen mixture, generally contains about 0.01 weight percent to 5 weight percent oxygen but preferably about 0.5 to 1.5 weight percent oxygen and is introduced at a flow rate such that the maximum temperature at the site of combustion is below about 960° F. The residual oxidizing gas and products of combustion are purged from the catalyst with an inert gas, e.g. nitrogen. The catalyst is cooled, generally to a temperature from about room temperature or 65° F. to 400° F., but preferably to a temperature in between about 250° to 350° F. and aluminum halide can be added to the catalyst, in accordance with procedures described above, to bring the concentration of the chloride within desirable limits, e.g. about 2 to 50 weight percent, for this catalyst.

In one modification of the second embodiment, the catalyst can be initially heated at temperatures generally of at least about 750° F. and preferably not above 1100° F. under a partial vacuum, generally of about 500 to 10 mm. Hg absolute and preferably of about 150 to 50 mm. Hg absolute. An inert gas, e.g. nitrogen, is bled into the area under vacuum, while substantially maintaining the vacuum and preferably with about two to three bleedings in succession, for the purpose of aiding in the removal of aluminum halide from the catalyst and the catalyst is purged with inert gas, e.g. nitrogen. At this point an oxygen-containing or oxidizing gas is introduced and the procedure described above is followed. The evacuated aluminum halide can be recovered in for example, a bauxite or an activated alumina absorber.

In a second modification of the second embodiment, the oxygen-containing gas may comprise a nitrogen-oxygen-hydrogen halide mixture or an oxygen-hydrogen halide mixture such as for example, with an oxygen concentration of about 0.1 to 2 weight percent and a hydrogen halide concentration of about 5 to 99 weight percent. Conditions at the site of combustion in this modification generally include temperatures from about 650° to 800° F. and a pressure from about 0 to 500 p.s.i.g. The inclusion of hydrogen halide in the oxidizing or oxygen-containing gas is preferred since water can be produced during the coke burning and may hydrolyze any aluminum halide left after the purge unless the hydrogen halide concentration is maintained at a sufficiently high value to prevent hydrolysis. It will be obvious to those skilled in the art that the first and second modifications can be adapted either alone or in combination with the second embodiment.

The following specific examples will serve to illustrate our invention but are not to be considered limiting.

EXAMPLE I (A)

A noble metal-alumina composition of the kind described in application Serial No. 489,726, filed February 21, 1955, can be employed in the process of our invention. The composition of this application can be made as follows. Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to <0.2% chloride by successive filtrations and reslurryings in deionized water until the desired chloride concentration is reached. In each reslurrying ammonia is added to give a pH of about 9. The washed hydrate is covered with water in a container and aged at about 90° F. until it is approximately 70% trihydrate, the remainder being substantially of the amorphous or monohydrate forms. The total hydrate composition is comprised of about 42% bayerite, 18% randomite, 11% gibbsite, 20% boehmite, and 9% amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per milliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company Infra-red Moisture Meter containing a 125 watt bulb, Cat. No. 26675. The resulting mixture is forced through a die plate having holes 1/16" in diameter bolted to a 3½" welding engineer's screw extruder. The resulting strands are broken to particles of length varying generally between about 1/16" to 1".

The particles are dried at 230° F. and calcined by heating to 925° F. in a flow of nitrogen gas followed by a flow of air while the catalyst is maintained at a temperature in the range of 865 to 920° F. The composition thus produced analyzes about 0.6 weight percent of platinum which is in sufficiently divided form so as to exhibit by X-ray diffraction studies the substantial absence of crystallites or crystals of size larger than 50 angstrom units. After the calcination the composition has an area (BET method) within the range from about 350 to 550 square meters/gram.

(B)

A platinum-alumina composition prepared essentially as described above in (A), except that air was used for the complete calcination procedure and containing about 0.6% platinum was employed in the process of the present invention by the following procedure. A one-liter, three-necked flask was fitted with a heating mantle, thermometer and an air inlet line having a drying tower filled with Drierite. The flask was fastened to a Syntron Paper Jogger which provided agitation of the catalyst during the impregnation. The flask was swept out with dry air for about 10 minutes. 150 grams of the platinum-alumina composition and 45 grams of aluminum chloride were charged to the flask. The air was turned off, the flask was stoppered and the drying tower was disconnected from the air line. Heating of the flask was begun and the temperature of the mixture was brought slowly to approximately 445° F. in about three hours. The heat was turned off and the catalyst was cooled and transferred to a moisture-tight container. The resulting catalyst contained 19.3 weight percent aluminum chloride based upon the platinum-alumina catalyst.

(C)

Hydrogen halide may be added to a noble-metal activated alumina-aluminum halide composition prior to charging the composition into processing equipment, e.g. an isomerization reactor, in accordance with the following procedure.

20 g. of catalyst composite per Example I(B) is charged to a one-inch I.D. Pyrex tube, fitted with a support medium and drying tube at outlet. Arrangements are made to pass dry nitrogen, followed by hydrogen at one atmosphere pressure. Into the hydrogen stream is introduced about 5 volume percent of dry hydrogen chloride. This mixture is advantageously at a rate of about 300 VHSV (volume of gas per volume of catalyst per hour space velocity). This treatment is continued for one hour during which there is an appreciable rise in temperature from the exothermic interaction of the hydrogen chloride and the $AlCl_3$/platinum/alumina composition. After one hour the source of hydrogen chloride is shut off, the hydrogen flow continued for a few minutes, then followed by passage of dry nitrogen for about 15 minutes. The catalyst is discharged from the Pyrex tube in a manner to avoid contact with the moisture in the air. This treatment adds about one and one-half percent chloride to the catalyst.

(D)

*Deactivation of a Noble Metal-Aluminum Halide-Hydrogen Halide Catalyst*

A universal 1" I.D. reactor is charged with 30 grams of Pt—$Al_2O_3$—$AlCl_3$—HCl catalyst, prepared essentially as described above in Example I(C), in a non-diluted bed. The reactor is placed in a bronze block electric furnace controlled by Micro-switches. Deoxygenated hydrogen at atmospheric pressure is passed over the catalyst at rate of one cubic foot per hour and the temperature is raised to 250° F. The pressure is raised to 300 p.s.i.g. and the reactor is lined out under the following conditions: temperature, 250° F.; pressure, 300 p.s.i.g.; $H_2$/hydrocarbon mole ratio, 10/1; and WHSV, 5. The feed is commercial pure grade n-pentane containing 5 weight percent $CCl_4$ and poisoned with 5 weight percent thiophene.

After a prerun of one hour, a sample of the isomerate is collected and analysis by vapor phase chromatography indicates it to contain 70 weight percent isopentane. Three hours later the isopentane content of the isomerate is 35 weight percent. The hydrocarbon feed is stopped and the reactor is allowed to cool under a slow flow of $H_2$. The reactor is opened and 3 grams of the catalyst are removed for inspection. The catalyst pellets are dark and analysis indicates 2.5 weight percent carbon and 0.75 weight percent S to be present on the deactivated catalyst.

(E)

Regeneration of a sulfur and carbon contaminated noble metal-aluminum halide-alumina-hydrogen halide catalyst.

For regeneration of the deactivated catalyst of Example I(D), the reactor is replaced in the furnace and a hydrogen flow rate of 1 cubic foot per hour is established at atmospheric pressure. The temperature is raised to 760° F. and held at this point for 5 hours. The hydrogen is purged from the reactor with $N_2$. A nitrogen-oxygen gas blend containing 1.0 weight percent oxygen is admitted to the reactor at such a rate that the maximum temperature in the combustion zone is 950° F. during the carbon burn-off. In 3 hours the combustion zone moves completely through the bed. The residual oxygen and combustion products are purged from the catalyst with nitrogen. A hydrogen flow rate of 1 cubic foot per hour is established and the temperature is lowered to 250° F. over a 2-hour period.

Eight grams of anhydrous AlCl₃ are sublimed into the reactor by passing the hydrogen gas through a packed tower of AlCl₃ heated at 275° F. When all the AlCl₃ has entered the reactor, the pressure is raised to 300 p.s.i.g. The reactor is blocked in overnight at 300 p.s.i.g. and 250° F.

A feed, commercial pure grade n-pentane plus 5 weight percent CCl₄, is processed over the regenerated catalyst at the following conditions: temperature, 250° F.; pressure, 300 p.s.i.g.; hydrogen to hydrocarbon mole ratio, 10/1; and WHSV, 5. After a prerun of one hour, the isomerate contains 69 weight percent isopentane. This shows that the above regeneration has restored the catalyst to substantially virgin activity.

EXAMPLE II

The following example illustrates the regeneration of essentially the same sulfur and carbon contaminated platinum-aluminum halide-alumina-hydrogen halide catalyst contaminated in Example I(D) above, the pellets of which are dark and analysis indicates 2.5 weight percent carbon and 0.75 weight percent sulfur to be present on the deactivated catalyst.

For regeneration of this deactivated catalyst, a reactor containing the catalyst is connected to a source of vacuum, is evacuated to a pressure of 100 mm. Hg absolute and heated to a temperature of 765° F. Nitrogen is bled into the reactor three successive times while substantially maintaining a pressure of 100 mm. Hg absolute by drawing off gas containing aluminum chloride. The gas containing aluminum chloride is conducted through an activated alumina absorber which recovers the aluminum chloride. The vacuum is broken and the reactor purged with nitrogen. A nitrogen-oxygen gas blend containing 1.0 weight percent oxygen is admitted to the reactor at such a rate that the maximum temperature in the combustion zone is 950° F. in the carbon burn-off. In three hours the combustion zone moves completely through the bed. The residual oxygen and combustion products are purged from the catalyst with nitrogen. A hydrogen flow rate of one cubic foot per hour is established and the temperature is lowered to 250° F. over a two-hour period.

Eight grams of anhydrous aluminum chloride are sublimed into the reactor by passing a hydrogen gas through a packed tower of aluminum chloride heated at 275° F. When all the aluminum chloride has entered the reactor the pressure is raised to 300 p.s.i.g. The reactor is placed in a bronze, block electric furnace, controlled by Microswitches, overnight at 300 p.s.i.g. and 200° F.

A feed, commercial pure grade n-pentane plus 5 weight percent CCl₄ is processed over the regenerated catalyst at the following conditions: temperature, 250° F.; pressure, 300 p.s.i.g.; hydrogen/hydrocarbon mole ratio of 10/1; and WHSV, 5. After a prerun of one hour, the isomerate contains 68 weight percent isopentane. This shows that the above regeneration has restored the catalyst to substantial virgin activity.

EXAMPLE III

*Regeneration of a Sulfur Contaminated Noble Metal-Aluminum Halide-Alumina-Hydrogen Halide Catalyst*

A universal 1" I.D. reactor is charged with 30 grams Pt—Al₂O₃—AlCl₃—HCl catalyst, prepared essentially as described above in Example I(C), in a non-diluted bed. The reactor is placed in a bronze block electric furnace controlled by Micro-switches. Deoxygenated hydrogen at atmospheric pressure is passed over the catalyst at the rate of one cubic foot per hour and the temperature is raised to 250° F. The pressure is increased to 300 p.s.i.g. and the reactor is lined out under the following conditions: temperature, 250° F.; pressure, 300 p.s.i.g.; hydrogen to hydrocarbon mole ratio, 10/1; and WHSV, 5. The feed is commercial pure grade n-pentane containing 5 weight percent CCl₄ and poisoned by saturation with H₂S.

After a prerun of one hour, a sample of the isomerate is collected and analysis by vapor phase chromatography indicates it to contain 65 weight percent isopentane. Two hours later the isopentane content of the isomerate is 10 weight percent. The hydrocarbon feed is stopped and the reactor is allowed to cool under a slow flow of hydrogen. The reactor is opened and 3 grams of the catalyst are removed for inspection. The catalyst pellets are a light gray and analysis indicates only a trace amount of carbon and 1.01 weight percent S to be present on the deactivated catalyst.

For regeneration of the catalyst, the reactor is replaced in the furnace and a hydrogen flow rate of 3 cubic feet per hour is established at atmospheric pressure. The temperature is raised to 600° F. and held at this point for 4 hours. The temperature is then dropped to 250° F. over a 2-hour period.

A feed, commercial pure grade n-pentane plus 5 weight percent CCl₄, is processed over the regenerated catalyst at the following conditions: temperature, 250° F.; pressure, 300 p.s.i.g.; hydrogen/hydrocarbon mole ratio, 10/1; and WHSV, 5. After a prerun of 1 hour, the isomerate contains 71 weight percent isopentane. This result is similar to that obtained using a fresh feed and a virgin catalyst.

It is claimed:

1. A process for regenerating a catalyst deactivated at relatively low temperatures in a hydrocarbon conversion process comprising heating the catalyst at a temperature from about 750° to 1200° F. and removing aluminum halide, purging the vicinity of the catalyst with a primary inert gas, introducing an oxidizing, carbon-burning, oxygen-containing gas to create an area of combustion below about 960° F. in the presence of the catalyst to burn carbon off of the catalyst, purging residual oxidizing gas and products of combustion with a secondary inert gas, cooling the catalyst to a temperature permitting the addition of aluminum halide, and adding aluminum halide to produce a final catalyst composition including about 2 to 50 weight percent of aluminum halide; said deactivated catalyst consisting essentially of about 0.01 to 2% of a platinum group noble metal, about 2 to 50% of an aluminum halide-Friedel-Crafts component and about 40 to 95% of an activated alumina.

2. The process of claim 1 wherein the non-oxidizing gas is an inert hydrogen-containing gas, the primary inert gas is nitrogen, the secondary inert gas is nitrogen, the oxygen-containing gas contains about 0.01 to 5 weight percent oxygen, and the catalyst is cooled to a temperature from about 65° to 400° F.

3. The process of claim 2 wherein the noble metal is platinum and is about 0.1 to 0.75% of the catalyst, the aluminum halide is aluminum chloride and is about 10 to 30% of the catalyst and the alumina is derived by calcination of an alumina hydrate precursor consisting essentially of about 5 to 95% of alumina trihydrate and about 5 to 35% of a member selected from the group consisting of amorphous hydrous alumina, alumina monohydrate and their mixture, and the activated alumina has an area of about 350 to 550 square meters per gram.

4. A process for regenerating a catalyst deactivated at relatively low temperatures in a hydrocarbon conversion process comprising heating the catalyst in an area under vacuum of about 500 to 10 mm. Hg at a temperature of at least about 750° F. to substantially remove aluminum halide, bleeding an inert gas into the area and withdrawing gas from the area while substantially maintaining the vacuum, breaking the vacuum, purging the area with a primary inert gas, introducing an oxidizing carbon-burning, oxygen-containing gas to create an area of combustion below about 960° F. in the presence of the catalyst to burn carbon off of the catalyst, purging residual oxidizing gas and products of combustion with a secondary inert gas, cooling the catalyst to a temperature permitting the addition of aluminum halide, and adding aluminum halide to produce a final catalyst composition including about 2 to 50 weight percent of aluminum halide; said deactivated catalyst consisting essentially of about 0.01–2% of a platinum group noble metal, about 2–50% of an aluminum halide-Friedel-Crafts component and about 40–95% of an activated alumina.

5. The process of claim 4 wherein the primary inert gas is nitrogen, the secondary inert gas is nitrogen, the oxygen-containing gas contains about 0.01 to 5 weight percent oxygen, and the catalyst is cooled to a temperature from about 65° F. to 400° F.

6. The process of claim 5 wherein the noble metal is platinum and is about 0.1 to 0.75% of the catalyst, the aluminum halide is aluminum chloride and is about 10 to 30% of the catalyst and the alumina is derived by calcination of an alumina hydrate precursor consisting essentially of about 5 to 95% of alumina trihydrate and about 5 to 35% of a member selected from the group consisting of amorphous hydrous alumina, alumina monohydrate and their mixture, and the activated alumina has an area of about 350 to 550 square meters per gram.

7. A process for regenerating a catalyst deactivated at relatively low temperatures in a hydrocarbon conversion process comprising heating the catalyst at a temperature from about 750° to 1200° F. in the presence of a non-oxidizing regeneration gas to substantially remove aluminum halide, purging the non-oxidizing regeneration gas from the vicinity of the catalyst with a primary inert gas, introducing an oxidizing carbon-burning, oxygen-containing gas to create an area of combustion below about 960° F. in the presence of the catalyst to burn carbon off of the catalyst, purging residual oxidizing gas and products of combustion with a secondary inert gas, cooling the catalyst to a temperature permitting the addition of aluminum halide, and adding aluminum halide to produce a final catalyst composition including about 2 to 50 weight percent of aluminum halide; said deactivated catalyst consisting essentially of about 0.01 to 2% of a platinum group noble metal, about 2 to 50% of an aluminum halide-Friedel-Crafts component and about 40 to 95% of an activated alumina.

8. The process of claim 7 wherein the non-oxidizing gas is a hydrogen-containing gas.

9. The process of claim 8 wherein the primary inert gas is nitrogen, the secondary inert gas is nitrogen, the oxygen-containing gas contains about 0.01 to 5 weight percent oxygen, and the catalyst is cooled to a temperature from about 65° F. to 400° F.

10. The process of claim 9 wherein the noble metal is platinum and is about 0.1 to 0.75% of the catalyst, the aluminum halide is aluminum chloride and is about 10 to 30% of the catalyst and the alumina is derived by calcination of an alumina hydrate precursor consisting essentially of about 5 to 95% of alumina trihydrate and about 5 to 35% of a member selected from the group consisting of amorphous hydrous alumina, alumina monohydrate and their mixture, and the activated alumina has an area of about 350 to 550 square meters per gram.

References Cited in the file of this patent
UNITED STATES PATENTS

| | | |
|---|---|---|
| 2,205,409 | Houdry | June 25, 1940 |
| 2,226,548 | Burk | Dec. 31, 1940 |
| 2,368,507 | Welty | Jan. 30, 1945 |
| 2,386,050 | Holder | Oct. 2, 1945 |
| 2,785,138 | Milliken | Mar. 12, 1957 |
| 2,870,085 | Love | Jan. 20, 1959 |
| 2,900,425 | Bloch et al. | Aug. 18, 1959 |